(12) United States Patent
Su et al.

(10) Patent No.: US 11,116,276 B2
(45) Date of Patent: Sep. 14, 2021

(54) SHOE COVER (71) Applicant: SUZHOU ADDISON NONWOVEN PRODUCT CO., LTD., Jiangsu (CN)

(72) Inventors: Jau-Ming Su, Jiangsu (CN); Xiurong He, Jiangsu (CN); Huan Wang, Jiangsu (CN)

(73) Assignee: SUZHOU ADDISON NONWOVEN PRODUCT CO., LTD., Suzhou (CN)

( * ) Notice: Subject to any disclaimer, the term of this patent is extended or adjusted under 35 U.S.C. 154(b) by 47 days.

(21) Appl. No.: 15/771,065

(22) PCT Filed: Oct. 25, 2016

(86) PCT No.: PCT/CN2016/103298
§ 371 (c)(1),
(2) Date: Apr. 25, 2018

(87) PCT Pub. No.: WO2017/071570
PCT Pub. Date: May 4, 2017

(65) Prior Publication Data
US 2018/0303192 A1 Oct. 25, 2018

(30) Foreign Application Priority Data
Oct. 26, 2015 (CN) .......................... 201520832885.1

(51) Int. Cl.
A43B 3/16 (2006.01)
A43B 13/22 (2006.01)
(Continued)

(52) U.S. Cl.
CPC .................. *A43B 3/16* (2013.01); *B32B 3/16* (2013.01); *B32B 5/022* (2013.01); *B32B 7/12* (2013.01);
(Continued)

(58) Field of Classification Search
CPC .. A43B 3/16; A43B 3/248; A43B 5/18; A43B 13/22; A43C 11/004
(Continued)

(56) References Cited

U.S. PATENT DOCUMENTS 3,851,411 A * 12/1974 Crosbie ............... C08L 2666/04
36/68
4,616,429 A 10/1986 Alcala
(Continued)

FOREIGN PATENT DOCUMENTS

| CN | 2262352 | 9/1997 |
|---|---|---|
| CN | 2666219 | 12/2004 |

(Continued)

OTHER PUBLICATIONS

International Search Report for International Application No. PCT/CN2016/103298, dated Dec. 15, 2016 in 8 pages.

*Primary Examiner* — Sharon M Prange
(74) *Attorney, Agent, or Firm* — Schmeiser, Olsen & Watts, LLP (57) ABSTRACT A shoe cover comprises a shoe cover upper and a shoe cover sole. A shoe cover opening is provided at the top of the shoe cover upper, and the shoe cover opening is provided with a first elastic ring. The shoe cover sole is connected with the bottom of the shoe cover upper. A second elastic ring is provided at where the shoe cover upper connects the shoe cover sole. The second elastic ring straps the shoe cover upper and the shoe cover sole onto either a foot or a shoe, prevents the shoe cover from falling off, and facilitates the shoe cover upper and the shoe cover sole in affixing onto the foot or shoe.

10 Claims, 7 Drawing Sheets (51) Int. Cl.
  *C08L 23/16* (2006.01)
  *B32B 3/16* (2006.01)
  *B32B 5/02* (2006.01)
  *B32B 7/12* (2006.01)
  *B32B 27/08* (2006.01)
  *B32B 27/12* (2006.01)
  *B32B 27/32* (2006.01)
  *C08L 23/06* (2006.01)
  *C08L 23/12* (2006.01)
  *C08L 23/14* (2006.01)
  *A43B 23/02* (2006.01)
  *A43B 13/12* (2006.01)

(52) U.S. Cl.
  CPC .............. *B32B 27/08* (2013.01); *B32B 27/12* (2013.01); *B32B 27/32* (2013.01); *C08L 23/06* (2013.01); *C08L 23/12* (2013.01); *C08L 23/14* (2013.01); *C08L 23/16* (2013.01); *A43B 13/122* (2013.01); *A43B 13/22* (2013.01); *A43B 23/026* (2013.01); *B32B 2307/744* (2013.01); *B32B 2437/02* (2013.01); *C08F 2500/15* (2013.01)

(58) Field of Classification Search
  USPC .............................. 36/7.1 R, 7.3, 7.2, 10, 8.3
  See application file for complete search history.

(56) References Cited

U.S. PATENT DOCUMENTS

| | | | | |
|---|---|---|---|---|
| 5,112,421 A * | 5/1992 | Honda | ...................... | B32B 5/00 156/148 |
| 5,150,536 A | 9/1992 | Strong | | |
| 5,251,386 A * | 10/1993 | Diaz | ...................... | A41D 17/00 36/2 R |
| 5,822,884 A * | 10/1998 | Roeder | .................. | A43B 3/163 36/7.1 R |
| 6,023,856 A * | 2/2000 | Brunson | ................ | A43B 3/163 36/7.1 R |
| 6,209,227 B1 * | 4/2001 | Swango | .................... | A43B 3/16 36/7.1 R |
| 6,833,171 B2 * | 12/2004 | Campbell | ................. | A43B 3/16 36/4 |
| 9,635,900 B1 * | 5/2017 | Rolle | ........................ | A43B 3/24 |
| 2003/0119410 A1 * | 6/2003 | Bodaghi | ................... | B32B 5/06 442/400 |
| 2003/0190442 A1 * | 10/2003 | Campbell | ................. | A43B 3/16 428/35.2 |
| 2008/0014819 A1 * | 1/2008 | Suzuki | ............. | A61F 13/49009 442/401 |
| 2009/0105397 A1 * | 4/2009 | Van Riel | ................ | C08F 297/08 524/505 |
| 2010/0292403 A1 * | 11/2010 | Ansems | ................ | C08F 287/00 525/125 |
| 2013/0042501 A1 * | 2/2013 | Velazquez | .......... | A43B 23/0295 36/7.1 R |
| 2013/0074363 A1 * | 3/2013 | Adams | ................. | A43B 1/0027 36/7.1 R |
| 2016/0095377 A1 * | 4/2016 | Tamm | ...................... | A43B 1/04 36/9 R |
| 2017/0074829 A1 * | 3/2017 | Mertins | .................. | D04H 3/045 |
| 2017/0181498 A1 * | 6/2017 | Whelan | ...................... | C08J 9/30 |

FOREIGN PATENT DOCUMENTS

| | | |
|---|---|---|
| CN | 202197918 | 4/2012 |
| CN | 103478979 | 1/2014 |
| CN | 104844939 | 8/2015 |
| CN | 205053010 | 3/2016 |

* cited by examiner

SHOE COVER

TECHNICAL FIELD OF THE INVENTION

The present application belongs to the field of personal protective articles, and in particular to a shoe cover.

BACKGROUND OF THE INVENTION

Shoe covers are widely used in hospital clinics, home life, agriculture and aquaculture, outdoor activities and other fields, so there is a greater market demand; according to the material and use of the shoe covers, they can be divided into non-woven shoe cover, CPE shoe cover, cloth shoe cover, anti-static shoe cover, flannel shoe cover, rain shoe cover, anti-slip shoe cover and so on. At present, shoe covers on the market are basically manually sewn, which require to go through the processes such as cutting, sewing, sorting and packaging, expends a lot of manpower cost and have low production efficiency. Of course, a small part of the shoe covers are made by automation equipment, and the cost of the shoe covers produced thereby is greatly reduced, however, there are many defects in the shoe covers: the shoe cover could not tighten a foot and is easy to fall off; the opening of the toe is easily torn; and the fabrics of the toe and the heel are redundant and are easy to be stepped on and lead to tumbling.

SUMMARY OF THE INVENTION

The present application is aimed at overcoming the shortcomings of the prior art and providing a shoe cover.

To achieve the above purpose, the technical solution employed by the present application is: a shoe cover comprising:

a shoe cover upper provided with a shoe cover opening at the top thereof; the shoe cover opening is provided with a first elastic ring;

a shoe cover sole connected with the bottom of the shoe cover upper; a second elastic ring is provided on the shoe cover upper near the shoe cover sole.

In some embodiments, the shoe cover opening has a front sealing part an In some embodiments, the shoe cover opening has a front sealing part and a rear sealing part corresponding to the shoe cover upper, and the front sealing part and the rear sealing part have reinforced structures.

In some embodiments, a plurality of anti-slip strips are provided at the bottom of the shoe cover sole.

In some embodiments, it is formed by sealing after folding fabric in half.

In some embodiments, at least the front portion of the shoe cover upper is curve-shaped, and the front portion and rear portion of the shoe cover sole are also curve-shaped.

In some embodiments, the distance between the second elastic ring and the bottom of the shoe cover sole is 5-25 mm.

In some embodiments, the shoe cover is fabricated by automation equipment.

In some embodiments, the reinforced structure is a sewing thread added in the front or rear of the front sealing part or the rear sealing part, a cladding fabric strip folded in half and sealed therewith; or, sealing area added for it.

In some embodiments, the anti-slip strips are in the shape of strips, circles, dots, S-shapes or other shapes, and are made of non-stick high-friction polymeric material.

In some embodiments, the shoe cover fabric is formed by bonding non-stick high-friction polymeric material and non-woven fabric, or is made of one of non-woven fabric or plastic film.

In some embodiments, the shoe cover fabric is made of non-woven fabric composite, non-woven fabric or plastic film; the non-woven fabric composite is formed by bonding non-stick high-friction polymeric material and non-woven fabric.

The non-stick high-friction polymeric material contains an isotactic polypropylene polymer and/or an isotactic polypropylene derivative, and the flow rate parameter of the isotactic polypropylene polymer and/or the isotactic polypropylene derivative is 5-15, preferably 5.5-8; the flow rate parameter is calculated as $(MI_{5\ KG} - MI_{2.16\ KG})/(5-2.16)$, where $MI_{5\ kg}$ and $MI_{2.16\ kg}$ are melt indexes respectively measured according to ASTM Standard D1238 (Standard Test Method for Melt Flow Rates of Thermoplastics) at 190° C. and at a test loads of 5 kg and 2.16 kg, respectively, namely the ratios of the melt index increment to the load increment for the two loads, which represents the sensitivity of the material to shear forces.

In some embodiments, the non-stick high-friction polymeric material contains an isotactic polypropylene structure and/or an isotactic polypropylene derivative structure (the polypropylene derivative structure here refers to a polypropylene structure which is grafted or segmented with usual groups such as ethyl, butyl, hexyl, octyl, etc.), which specifically refers to the structure of the general formula of it or components thereof contains a block of an isotactic polypropylene structure and/or an isotactic polypropylene derivative structure, and a block of such chemical structures may be arranged irregularly or regularly; and the flow rate parameter of the isotactic polypropylene structure and/or the isotactic polypropylene derivative structure is 5-15.

In some embodiments, the isotactic polypropylene polymer and/or the isotactic polypropylene derivative contains isotactic co-polypropylene elastomer containing 5-30% by mass of ethylene structures and/or isotactic homo-polypropylene having a melt index of 1-15 g/10 min, namely the melt index measured according to ASTM Standard D1238 at 190° C. and at a test load of 2.16 kg is 1-15 g/10 min.

In some embodiments, the raw material formula of the non-stick high-friction polymeric material contains the following components in percentage by mass:

20-90% of isotactic co-polypropylene elastomer; 10-80% of isotactic homo-polypropylene. In some embodiments, it may further contains a slip agent; 0-10% of an anti-block agent; 0-10% of an antistatic agent; 0-10% of a color masterbatch; 0-10% of a flame retardant; 0-10% of an antibacterial agent; 0-10% of a filling agent. Specifically, it may be added according to practical requirements, and it should be noted that some unexpected effects may be obtained when a variety of additives (for example, slip agents, antistatic agents, antibacterial agents and flame retardants) are used in combination: improving the toughness and the adhesion property with other substances of the polymeric material. Or, the blending ratio is 10-99.5% of isotactic co-polypropylene elastomer, 0-90% of polyethylene, 0-10%, preferably 0.5-10% of each of a slip agent, an anti-block agent, an antistatic agent, a color masterbatch, a flame retardant, an antibacterial agent, a filling agent.

The polymeric material employed in the above proportions, is made to be a film through melt-mixing, and film blowing or film casting; or is made to be a non-woven fabric composite through on-line thermal bonding with polypropylene non-woven fabric, cooling and curing, where the polypropylene non-woven fabric may be selected from corona-treated non-woven fabric to improve the adhesion. The film may be a monolayer film, or a coextruded or composite multilayer film of double layers or more, and may be single-sided or double-sided non-slip. The on-line bonding method includes on-line film casting, on-line coating and the like; the non-woven fabric composite may be single-sided or double-sided fully bonded, locally partially bonded, partially bonded in strip, dot, circle or other shape. Due to the present application contains the isotactic polypropylene structure and/or the isotactic polypropylene derivative structure, it has excellent mechanical properties; at the same time, the material with a specific flow rate parameter and melt index produces unexpected effects: the material obtained has high slip resistance and no stickiness. And, the non-woven composite has a polymeric material containing an isotactic polypropylene structure or/and an isotactic polypropylene derivative structure on one side and polypropylene on the other side, and with the same family of polymeric material, the two surface layers on both sides form a homogeneous single-phase structure through mutually diffusing, mutually penetrating and mutually entangling of molecules after heating and melting, which has a strong bonding strength after curing, without using adhesive. COF (coefficient of friction) thereof can be up to 0.3-1.8.

In some embodiments, the raw material formula of the non-stick high-friction polymeric material contains the following components in percentage by mass:

isotactic co-polypropylene elastomer 10-99.5%; polyethylene 0-90%. Preferably it may further contains 0-10% of a slip agent; 0-10% of an anti-block agent; 0-10% of an antistatic agent; 0-10% of a color masterbatch; 0-10% of a flame retardant; 0-10% of an antibacterial agent; 0-10% of a filling agent.

Further, the melt index of the isotactic polypropylene polymer and/or the isotactic polypropylene derivatives is 0.5-20 g/min; or, the density of the isotactic polypropylene polymer and/or the isotactic polypropylene derivative is 0.7-1.1 g/cm$^3$.

Due to the applying of the above technical solutions, the present application has the following advantages over the prior arts: The shoe cover of the present application, through providing the second elastic ring at where the shoe cover upper connects the shoe cover sole, utilize the second elastic ring to strap the shoe cover upper and the shoe cover sole onto either a foot or a shoe, which can prevent the shoe cover from falling off, and furthermore facilitates the shoe cover upper and the shoe cover sole in affixing onto the foot or shoe.

Wherein, 1—shoe cover upper; 2—shoe cover sole; 3—shoe cover opening; 4—front sealing part; 5—rear sealing part; 6—first elastic ring; 7—anti-slip strip; 8—second elastic ring; 9—fabric; 10—sewing thread; 11—blocky fabric; 12—sealing area; 13—sealing line; 14—folding line; 15—strip-shaped fabric; d—distance between the second elastic ring and the bottom of the shoe cover sole.

DETAILED DESCRIPTION OF EXEMPLARY EMBODIMENTS

The preferable embodiments of the present application are described herein after in detail combining with the accompanying drawings.

In the following definitions, the directions are defined in accordance with the directions observed by the user when the shoe cover covered on a foot.

Figure 1:
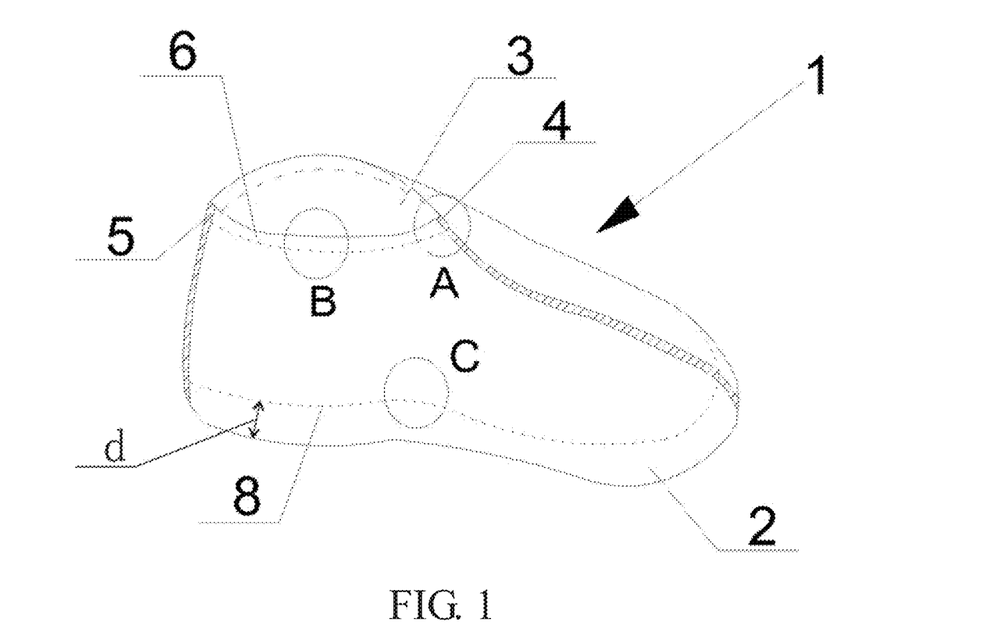
FIG. 1 shows a use state diagram of a shoe cover of the present application.
Figure 2:
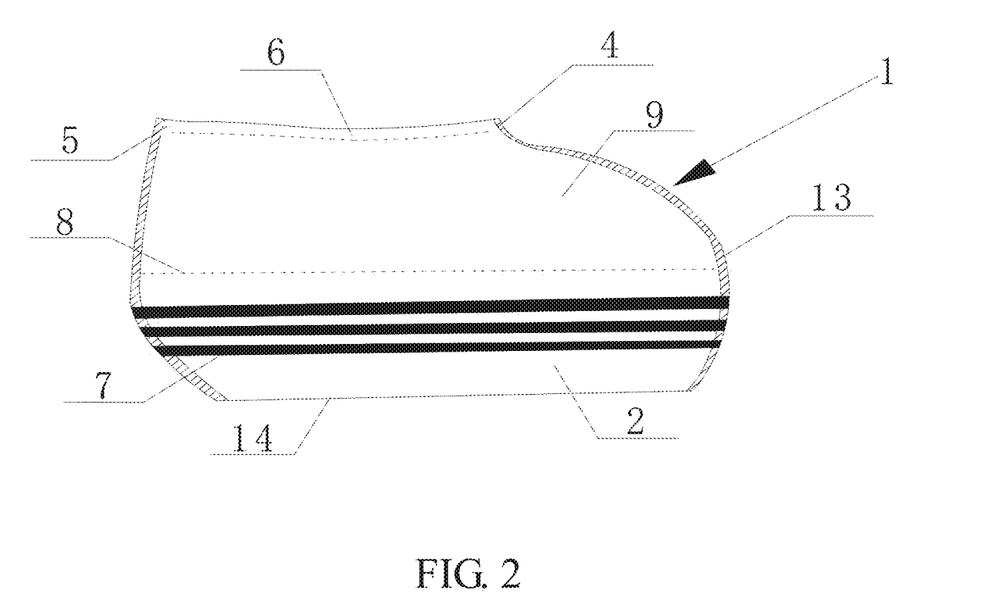
FIG. 2 shows a schematic diagram of the shoe cover in a folded and tightened state of the present application.

A shoe cover as shown in FIGS. 1 and 2, mainly comprises a shoe cover upper 1 and a shoe cover sole 2.

Figure 5:
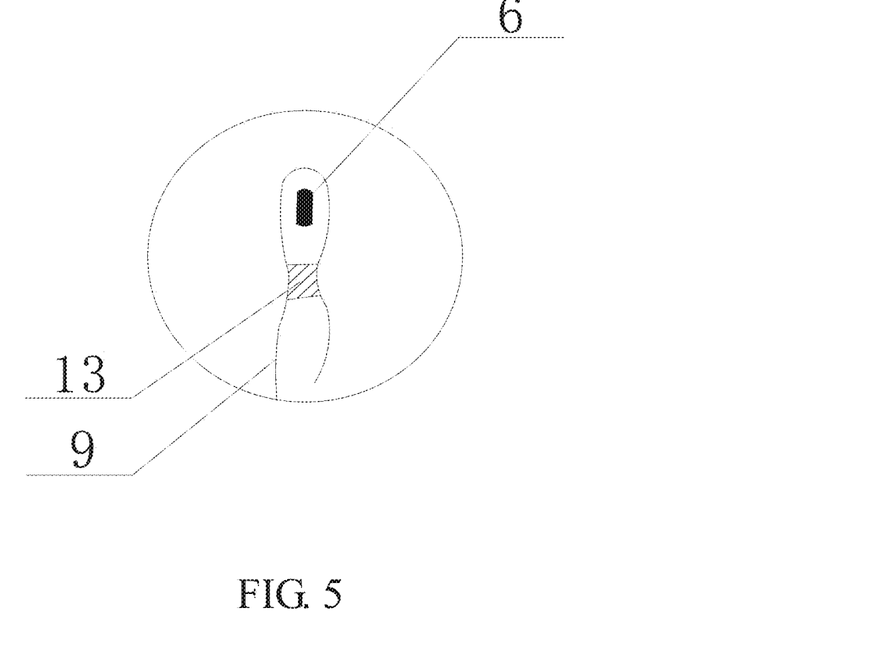
FIG. 5 shows a cross-sectional view of the first elastic ring B of the shoe cover of the present application.
Figure 6:
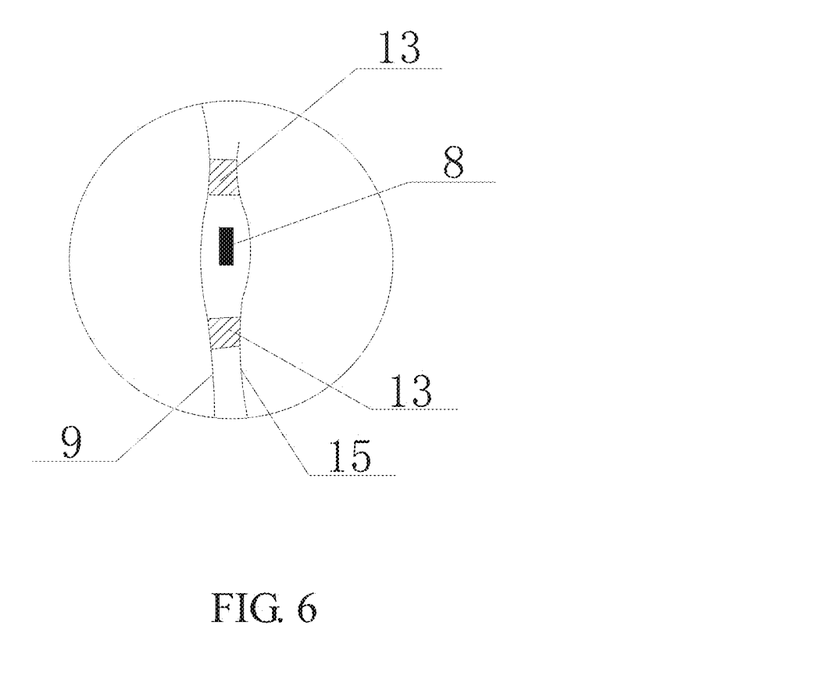
FIG. 6 shows a cross-sectional view of the first elastic ring C of the shoe cover of the present application.

Wherein, a shoe cover opening 3 is provided at the top of the shoe cover upper 1, such that the shoe cover opening 3 may strap the entire shoe cover onto either a shoe or a foot. The shoe cover opening 3 is provided with a first elastic ring 6 to function as contraction and prevent the shoe cover from falling off; the edge of fabric 9 is infolded for 5-20 mm when sealing (as shown in FIG. 5) by using ultrasonic wave (or other ways), such that an accommodating space for placing the first elastic ring 6 can be formed at the shoe cover opening 3. The shoe cover sole 2 is connected with the bottom of the shoe cover upper 1, and a second elastic ring 8 is provided on the shoe cover upper 1 near the shoe cover sole 2. As shown in FIG. 6, an accommodating space is formed by sealing a strip-shaped fabric 15 with the fabric 9 by using ultrasonic wave (or other ways) to place the second elastic ring 8, such that the second elastic ring 8 is located between a lower portion of the shoe cover upper 1 and an upper portion of the shoe cover sole 2, which can utilize the second elastic ring 8 to strap the shoe cover upper 1 and the shoe cover sole 2 onto either a foot or a shoe, which can prevent the shoe cover from falling off on one hand, and facilitates the shoe cover upper and the shoe cover sole in affixing onto the foot or shoe on the other hand. As shown in FIG. 1, the distance d between the second elastic ring and the bottom of the shoe cover sole is 5-25 mm.

In this embodiment, as shown in FIG. 2, the shoe cover 1 and the shoe cover sole 2 may be integrated, that is, they are made of the same piece of fabric 9 (which is formed by bonding non-stick high-friction polymeric material and non-woven fabric, or is made of non-woven fabric or plastic film, specifically referring to Chinese invention patent No. 201510305749.1) by folding in half and sealing both sides, and a folding line 14 is the midline, which may simplify the manufacturing flow of shoe covers, and greatly improve the level of automated production of shoe covers, such that automation equipment is used for producing and processing, improving production efficiency. The sealing line 13 may be a straight line or an curve for the purpose of making the shoe cover more fitting and avoiding to be stepped on and lead to tumbling, and at least the front portion of the shoe cover upper 1 and the front portion and rear portion of the shoe cover sole 2 are curve-shaped (of course, the rear portion of the shoe cover upper 1 may also be curve-shaped), such that the redundant fabrics on the shoe cover upper 1 and the shoe cover sole 2 are removed.

Figure 4:
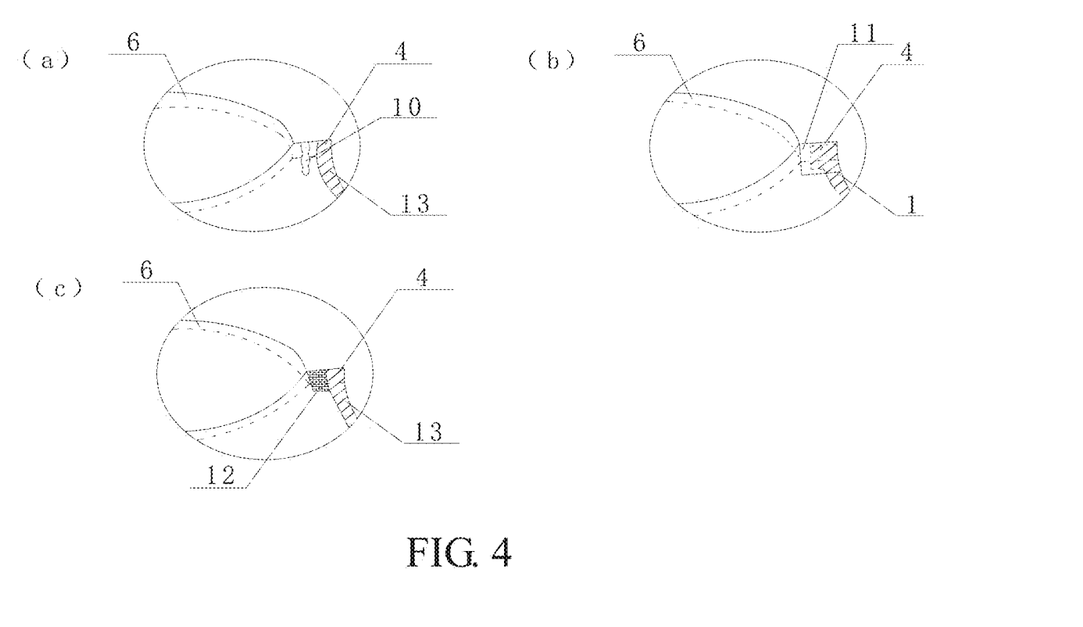
FIG. 4 shows an enlarged view of the sealing position A of the shoe cover opening of the present application.

The shoe cover formed after sealing forms a front sealing part 4 and a rear sealing part 5 where corresponds to the shoe cover opening 3, and a reinforced design may be provided in order to enhance the sealing strength at the front sealing part 4 and the rear sealing part 5 on the shoe cover opening 3 such that it has a corresponding reinforced structure, avoiding the opening is torn due to poor opening firmness during wearing. As shown in FIG. 4, there are a various kinds of reinforced designs: (1) adding a sewing thread 10 in front of (or in rear of, determined specifically according actual requirements) the front sealing part 4 as shown in FIG. 4(a); (2) employing blocky fabric 11 having the same material to the shoe cover, which is folded in half and cladded together to be sealed, as shown in FIG. 4(b); (3) adding sealing area 12 on the raw fabric 9, as shown in FIG. 4(c); these three kinds of reinforced manners may be used alone, or may be used in any combination.

Figure 3:
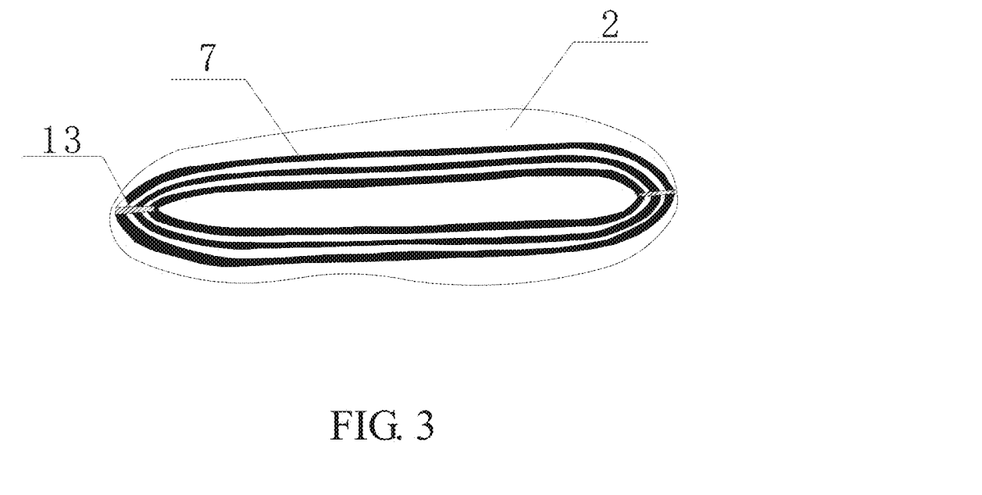
FIG. 3 shows a schematic diagram of the shoe cover sole of the present application.

In this embodiment, the shoe cover further comprises a plurality of anti-slip strips 7 provided at the bottom of the shoe cover sole 2 (as shown in FIG. 3), the plurality of anti-slip strips 7 are distributed from the middle to the external of the shoe cover sole 2, each anti-slip strip 7 is in the shape of strip, and is made of non-stick high-friction polymeric material (specifically referring to Chinese invention patent No. 201510305749.1), having a good anti-slip property. Of course, the anti-slip strips 7 may be provided in the shape of strips, circles, dots, S-shapes or other shapes according to requirements, and are made of non-stick high-friction polymeric material.

The non-stick high-friction polymeric material may employ a known type. The present application discloses a new kind of non-stick high-friction polymeric material to achieve better effects. The non-stick high-friction polymeric material contains an isotactic polypropylene polymer and/or an isotactic polypropylene derivative, and the flow rate parameter of the isotactic polypropylene polymer and/or the isotactic polypropylene derivative is 5-15, preferably 5.5-8; the flow rate parameter is calculated as $(MI_{5\ KG} - MI_{2.16\ KG})/(5-2.16)$, where $MI_{5\ kg}$ and $MI_{2.16\ kg}$ are melt indexes respectively measured according to ASTM Standard D1238 (Standard Test Method for Melt Flow Rates of Thermoplastics) at 190° C. and at a test loads of 5 kg and 2.16 kg, respectively, namely the ratios of the melt index increment to the load increment for the two loads, representing the sensitivity of the material to shear forces.

Further, the non-stick high-friction polymeric material contains an isotactic polypropylene structure and/or an isotactic polypropylene derivative structure (the polypropylene derivative structure here refers to a polypropylene structure which is grafted or segmented with usual groups such as ethyl, butyl, hexyl, octyl, etc.), which specifically refers to the structure of the general formula of it or components thereof contains a block of an isotactic polypropylene structure and/or an isotactic polypropylene derivative structure, and a block of such chemical structures may be arranged irregularly or regularly; and the flow rate parameter of the isotactic polypropylene structure and/or the isotactic polypropylene derivative structure is 5-15.

Further, the isotactic polypropylene polymer and/or the isotactic polypropylene derivative contain isotactic co-polypropylene elastomer containing 5-30% by mass of ethylene structures and/or isotactic homo-polypropylene having a melt index of 1-15 g/10 min, namely the melt index measured according to ASTM Standard D1238 at 190° C. and at a test load of 2.16 kg is 1-15 g/10 min.

Further, the raw material formula of the non-stick high-friction polymeric material contains the following components in percentage by mass:

20-90% of isotactic co-polypropylene elastomer; 10-80% of isotactic homo-polypropylene. More preferably, it may further contain 0-10% of a slip agent; 0-10% of an anti-block agent; 0-10% of an antistatic agent; 0-10% of a color masterbatch; 0-10% of a flame retardant; 0-10% of an antibacterial agent; 0-10% of a filling agent. Specifically, it may be added according to practical requirements, and it should be noted that some unexpected effects may be obtained when a variety of additives (for example, slip agents, antistatic agents, antibacterial agents and flame retardants) are used in combination: improving the toughness and the adhesion property with other substances of the polymeric material. Or, the blending ratio is 10-99.5% of isotactic co-polypropylene elastomer, 0-90% of polyethylene, 0-10%, preferably 0.5-10% of each of a slip agent, an anti-block agent, an antistatic agent, a color masterbatch, a flame retardant, an antibacterial agent, a filling agent.

The polymeric material employed the above proportions, is made to be a film through melt-mixing, and film blowing or film casting; or is made to be a non-woven fabric composite through on-line thermal bonding with polypropylene non-woven fabric, cooling and curing, wherein the polypropylene non-woven fabric may select corona-treated non-woven fabric to improve the adhesion. The film can be a monolayer film, or a coextruded or composite multilayer film of double layers or more, and may be single-sided or double-sided non-slip. The on-line bonding method includes on-line film casting, on-line coating and the like; the non-woven fabric composite may be single-sided or double-sided fully bonded, locally partially bonded, partially bonded in strip, dot, circle or other shape. Due to the present application contains the isotactic polypropylene structure and/or the isotactic polypropylene derivative structure, it has excellent mechanical properties; at the same time, the material with a specific flow rate parameter and melt index produces unexpected effects: the material obtained has high slip resistance and no stickiness. And, the non-woven composite consists of a polymeric material containing an isotactic polypropylene structure or/and an isotactic polypropylene derivative structure on one side and a polypropylene on the other side, and with the same family of polymeric material, the two surface layers on both sides form a homogeneous single-phase structure through mutually diffusing, mutually penetrating and mutually entangling of molecules after heating and melting, which has a strong bonding strength after curing, without using adhesive. COF (coefficient of friction) thereof can be up to 0.3-1.8.

Further, the raw material formula of the non-stick high-friction polymeric material contains the following components in percentage by mass:

10-99.5% of isotactic co-polypropylene elastomer; 0-90% of polyethylene. Preferably, it may further contain 0-10% of a slip agent; 0-10% of an anti-block agent; 0-10% of an antistatic agent; 0-10% of a color masterbatch; 0-10% of a flame retardant; 0-10% of an antibacterial agent; 0-10% of a filling agent.

Further, the melt index of the isotactic polypropylene polymer and/or the isotactic polypropylene derivatives is 0.5-20 g/min; or, the density of the isotactic polypropylene polymer and/or the isotactic polypropylene derivative is 0.7-1.1 g/cm$^3$.

The compositions and properties of the above-mentioned new non-stick high-friction polymeric material are introduced through specific embodiments in the following:

Embodiment 1

Figure 7:
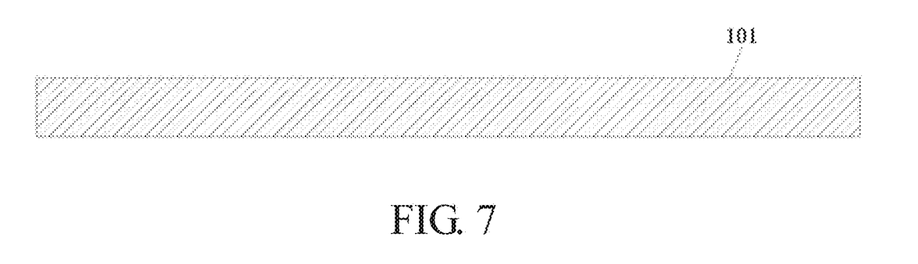
FIG. 7 shows a monolayer film made of the non-stick high-friction polymeric material disclosed by the present application.

Referring to FIG. 7, it is a non-stick high-friction monolayer film material disclosed by the present application, 101 is a film containing isotactic polypropylene polymer and derivative, and the compositions in percentage by mass thereof are: 60% of isotactic co-polypropylene elastomer, 38% of polyethylene, 2% of an antistatic agent; the thickness of the film is 30 um. The flow rate parameter of the isotactic co-polypropylene elastomer is 6.0. According to ASTM D1894, the COF is measured to be 1.25, and the results of comparison with existing materials in the market and other embodiments are shown in Table 1.

Figure 15:
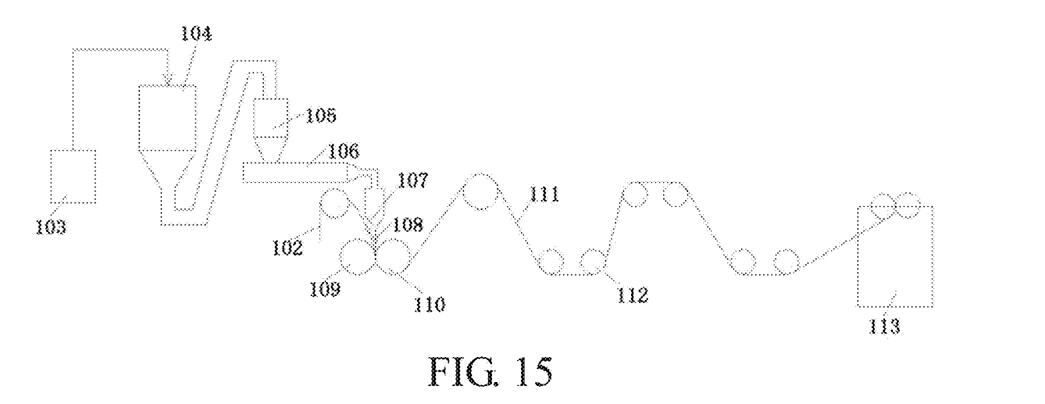
FIG. 15 shows a film casting preparation method of the non-stick high-friction material disclosed by the present application.

The present embodiment employs the film casting and extruding process, referring to FIG. 15, and the operating steps are as follows:

(1) weighing raw materials in the weighing area 103 according to the formulating ratio, (2) sucking the well-weighed raw materials into a high-speed mixer 104, (3) sucking the mixed raw materials into a extruder hopper 105, (4) melt mixing the raw materials in the extruder 106 and extruding the raw materials to be a melt curtain 108 through a die head 107, the temperature of the die head is controlled at 150-250° C., (5) casting the melt curtain between a steel roll 110 and a rubber roll 109, cooling and curing to obtain a film 111 at a pressure of laminating of 2.0-6.0 kgf/cm$^2$, which passes through a flattening roll 112 and a winding device 113 to give the material.

Embodiment 2

Figure 16:
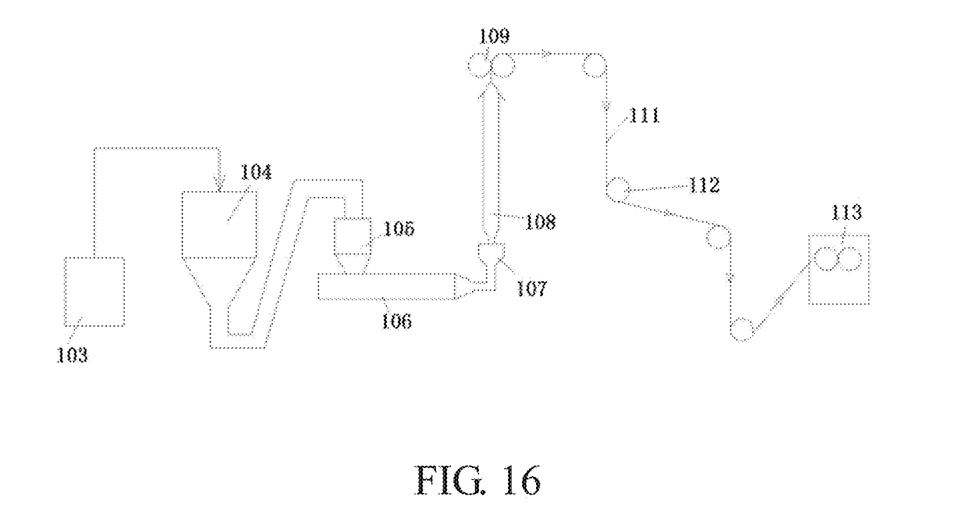
FIG. 16 shows a film blowing preparation method of the non-stick high-friction material disclosed by the present application.

The present embodiment employs the formulating ratio of Embodiment 1, and utilizes the film blowing and extruding process, referring to FIG. 16, and the operating steps are as follows:

(1) weighing raw materials in the weighing area 103 according to the formulating ratio, (2) sucking the well-weighed raw materials into a high-speed mixer 104, (3) sucking the mixed raw materials into a extruder hopper 105, (4) melt mixing the raw materials in the extruder 106 and extruding the raw materials to be a cylindrical thin bubble 108 through an annular die head 107 whose temperature is controlled at 150-250° C., cooling the cylindrical thin bubble through a cooling roll 109 to obtain a cylindrical film 111, flattening the cylindrical film through a drawing and flattening roll 112, winding the cylindrical film through a winding device 113, and single-split, double-split or non-split treating the cylindrical film during winding.

Embodiment 3

Figure 8:
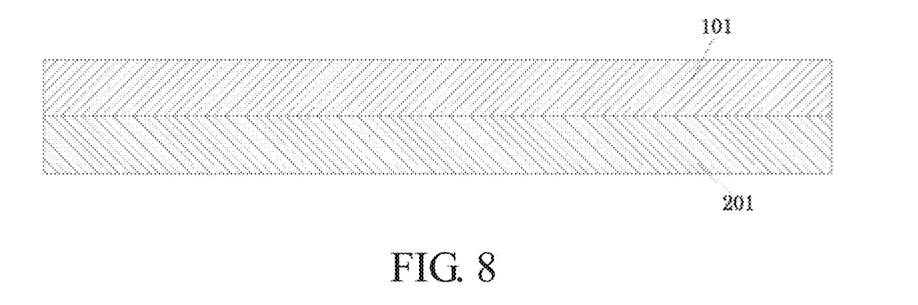
FIG. 8 shows a bi-layer film made of the non-stick high-friction polymeric material disclosed by the present application.

FIG. 8 shows a non-stick high-friction bi-layer film material disclosed by the present application, the thickness of the film is 30 um. 101 is a film containing isotactic polypropylene polymer and derivative, and the compositions in percentage by mass thereof are: 60% of isotactic co-polypropylene elastomer, 38% of polyethylene, 2% of an antistatic agent; the thickness of the film is 30 um. The flow rate parameter of the isotactic co-polypropylene elastomer is 6.0. 201 is polyethylene film. According to ASTM D1894, the COF of the layer surfaces of FIG. 8-101 and FIG. 8-201 are measured to be 1.25 and 0.30, respectively. The results of comparison with existing materials in the market and other embodiments are shown in Table 1.

The present embodiment employs a double-layer film casting machine, and the film casting and extruding process is the same as Embodiment 1.

Embodiment 4

Figure 9:
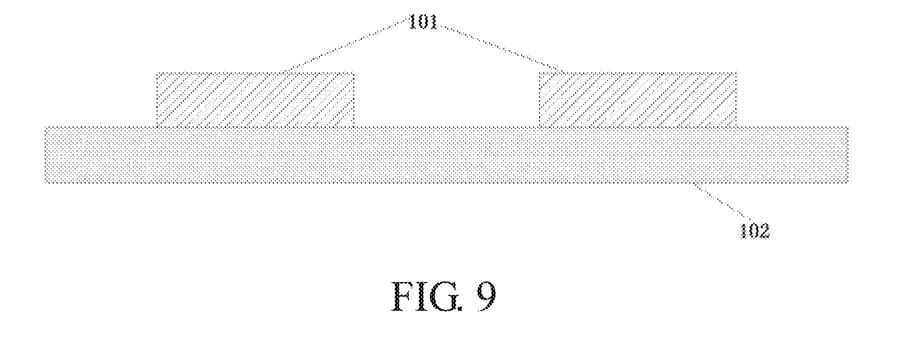
FIG. 9 shows a cross-sectional view of the non-stick high-friction strip-shaped composite disclosed by the present application.
Figure 10:
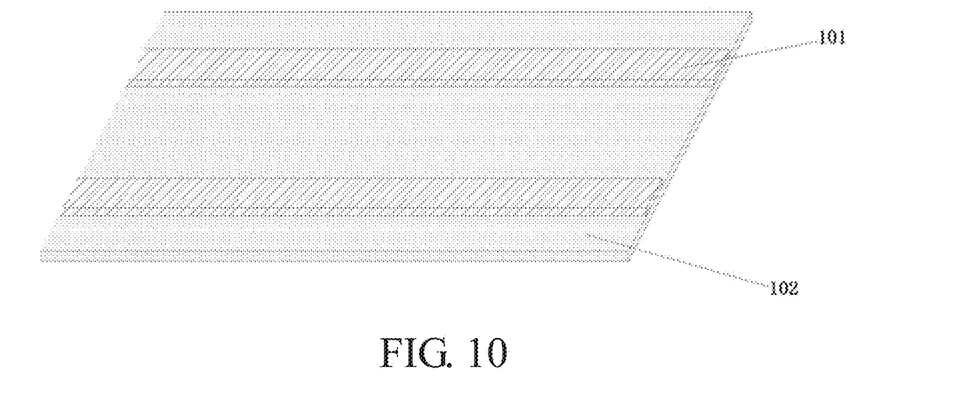
FIG. 10 shows a plan view of the non-stick high-friction strip-shaped composite disclosed by the present application.

FIGS. 9 and 10 show a non-stick high-friction strip-shaped composite disclosed by the present application, the components thereof are two strips of non-stick high-friction strip-shaped isotactic polypropylene polymer layered material (FIGS. 9-101 and 10-101) and polypropylene non-woven fabric (FIGS. 9-102 and 10-102), the compositions of both FIGS. 9-101 and 10-101 in percentage by mass are 80% of isotactic co-polypropylene elastomer, and 20% of isotactic homo-polypropylene; in the present embodiment, the flow rate parameter of the isotactic co-polypropylene elastomer is measured to be 6.0, and the flow rate parameter of the isotactic homo-polypropylene is 7.1, according to ASTM D1238, at 190° C. and at 2.16 kg and 5 kg. The thickness of each strip of non-stick high-friction strip-shaped material is 70 um, the width thereof is 1.0 cm, and the interval there between is 1.0 cm. FIGS. 9-102 and 10-102 are 40 gsm polypropylene non-woven fabrics. According to ASTM D1894, the COF is measured to be 1.36, and the results of comparison with existing products in the market and other embodiments are shown in Table 1.

The present embodiment employs the on-line thermal bonding process, referring to FIG. 15, and the operating steps are as follows:

(1) weighing raw materials in the weighing area 103 according to the formulating ratio, (2) sucking the well-weighed raw materials into a high-speed mixer 104, (3) sucking the mixed raw materials into a extruder hopper 105, (4) melt mixing the raw materials in the extruder 106 and extruding the raw materials to be a melt curtain 108 through a die head 107 (non-stick high-friction strip-shaped material 101), the temperature of the die head is controlled at 150-250° C., (5) casting the melt curtain onto a steel roll 109, drawing the polypropylene non-woven fabric 102 between a steel roll 110 and a rubber roll 109, thermally bonding the melt curtain and the non-woven fabric together at a pressure of laminating of 2.0-6.0 kgf/cm², cooling and curing to obtain a composite 111, which passes through a flattening roll 112 and a winding device 113 to give the material.

Embodiment 5

Figure 11:
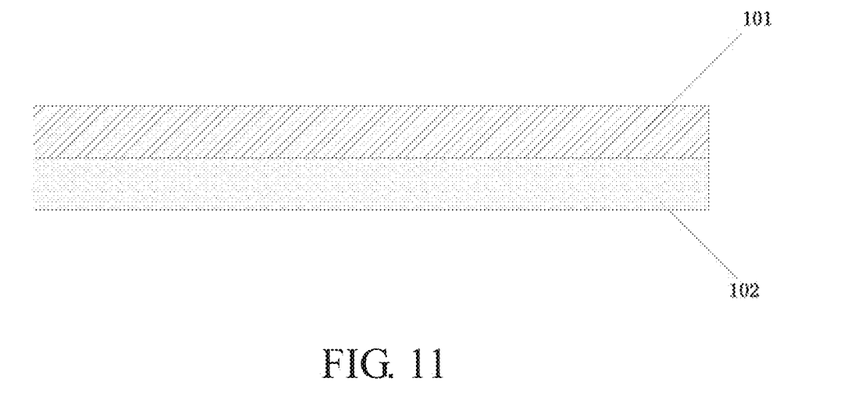
FIG. 11 shows a cross-sectional view of the non-stick high-friction full-composite disclosed by the present application.
Figure 12:
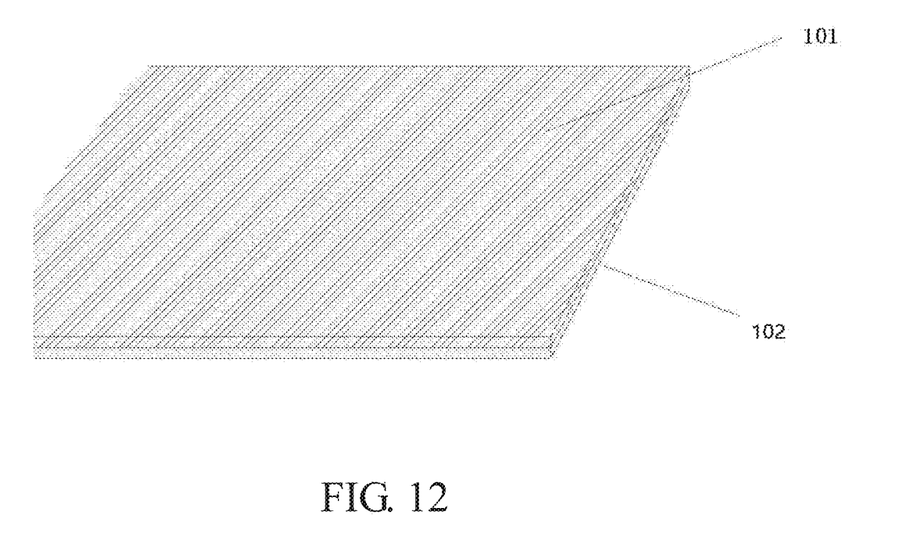
FIG. 12 shows a plan view of the non-stick high-friction full-composite disclosed by the present application.

FIGS. 11 and 12 show a non-stick high-friction full-composite disclosed by the present application, which is a composite structure constituted of a layer of non-stick high-friction isotactic polypropylene polymeric material (FIGS. 11-101 and 12-101) and polypropylene non-woven fabric (FIGS. 11-102 and 12-102), the compositions of both FIGS. 11-101 and 12-101 in percentage by mass are 99.5% of isotactic co-polypropylene elastomer, and 0.5% of an antistatic agent. According to ASTM D1238, at 190° C. and at 2.16 kg and 5 kg, the flow rate parameter of the propylene elastomer in the present embodiment is measured to be 6.0. The layer thickness of the non-stick high-friction material is 30 um. FIGS. 11-102 and 12-102 are 40 gsm polypropylene non-woven fabrics. According to ASTM D1894, the COF is measured to be 1.52, and the results of comparison with existing products in the market and other embodiments are shown in Table 1.

The on-line thermal bonding process of the present embodiment is the same as Embodiment 4.

Embodiment 6

Figure 13:
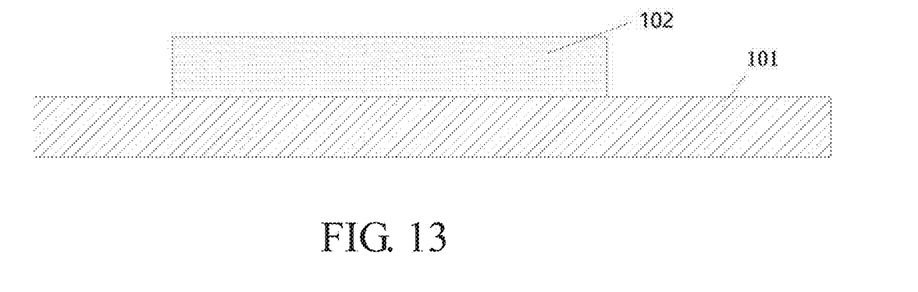
FIG. 13 shows a cross-sectional view of the non-stick high-friction local-composite disclosed by the present application.
Figure 14:
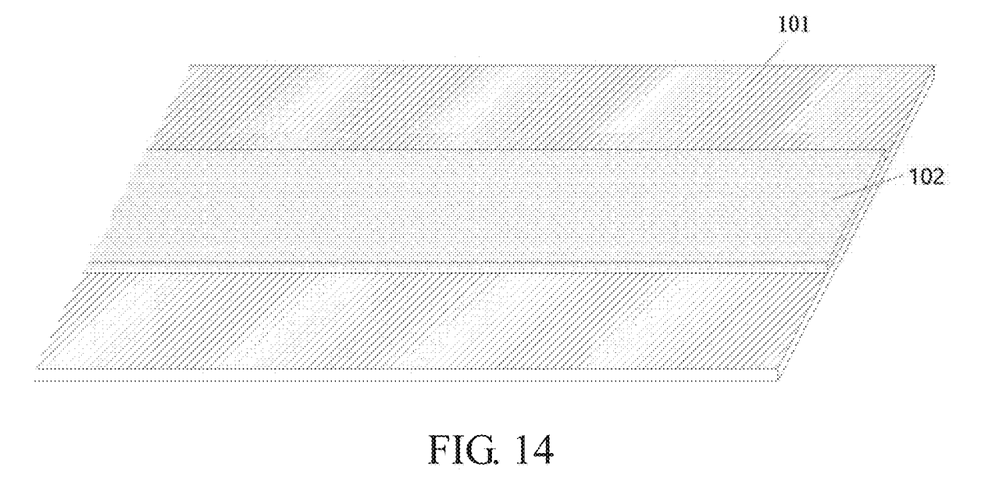
FIG. 14 shows a plan view of the non-stick high-friction local-composite disclosed by the present application.

FIGS. 13 and 14 are a non-stick high-friction local-composite disclosed by the present application, the components thereof are a layer of the polypropylene non-woven fabric (FIGS. 13-102 and 14-102) with a layer of the non-stick high-friction isotactic polypropylene polymeric material (FIGS. 13-101 and 14-101) on one surface thereof, the compositions of 101 in percentage by mass are 80% of isotactic co-polypropylene elastomer, and 20% of polyethylene, the flow rate parameter of the propylene elastomer in the present embodiment is measured to be 6.0, according to ASTM D1238, at 190° C. and at 2.16 kg and 5 kg. The thickness of the non-stick high-friction material layer is 40 um, and the width thereof is 140 cm. FIGS. 13-102 and 14-102 are 40 gsm polypropylene non-woven fabrics, the width thereof is 140 cm, and it is located in the middle of the non-stick high-friction material layer. According to ASTM D1894, the COF is measured to be 1.10, and the results of comparison with existing products in the market and other embodiments are shown in Table 1.

The on-line thermal bonding process of the present embodiment is the same as Embodiment 4.

Embodiment 7

Figure 17:
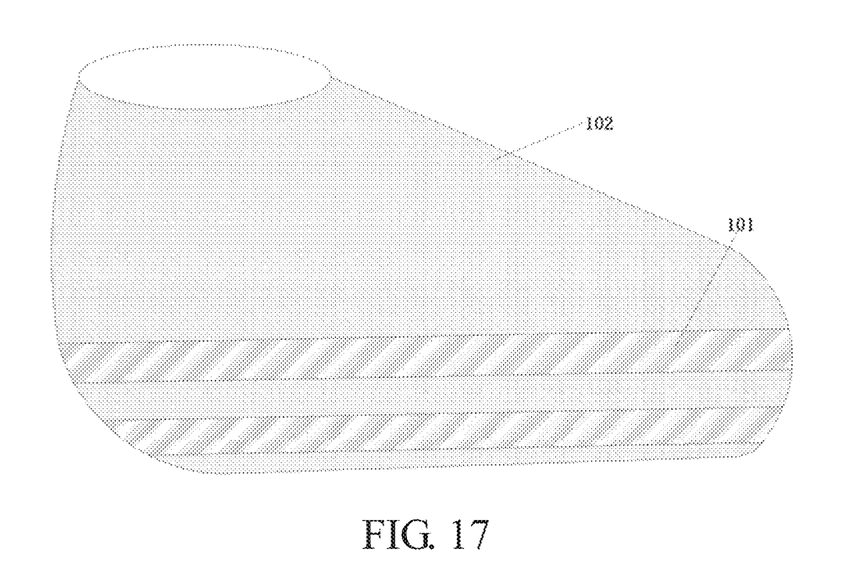
FIG. 17 shows a medical shoe cover disclosed by the present application.

Referring to FIG. 17, the shoe cover employs the material made in Embodiment 4, and is made through typesetting and cutting, and sewing manually or automatically. The shoe cover shown in FIG. 14 is in a situation that it is folded in half at the bottom. The anti-slip portions thereof are isotactic polypropylene polymer strips, the thickness of the anti-slip strips is 70 um, the number thereof is 4, the width thereof is 1.0 cm, the interval between two anti-slip strips is 1.0 cm, and the main body is 40 gsm polypropylene non-woven fabric. According to ASTM D1894, the COF is measured to be 1.36. Through test, this shoe cover has good wear-resisting property, and the results of comparison with existing materials in the market and other embodiments are shown in Table 2.

The static friction coefficients and the dynamic friction coefficients of the material made in the above-mentioned Embodiments 1-5 are tested according to ASTM Standard D1894, and the test result is shown in the following Table 1:

| Comparative Example | Property Indexes | |
|---|---|---|
| | Static Friction Coefficient ASTM D1894 | Dynamic Friction Coefficient ASTM D1894 |
| Embodiment 1 (monolayer film) | 1.25 | 0.89 |
| Embodiment 2 (monolayer film) | 1.25 | 0.89 |
| Embodiment 3 (bi-layer film FIG. 8-101 side) | 1.25 | 0.89 |
| Embodiment 4 (strip composite) | 1.36 | 0.93 |
| Embodiment 4 (full composite) | 1.52 | 1.43 |
| Embodiment 5 (local composite) | 1.10 | 0.83 |
| Material 1 in present market (film material) | 0.30 | 0.26 |
| Material 2 in present market (strip composite) | 0.55 | 0.49 |
| Material 2 in present market (full composite) | 0.64 | 0.39 |
| Material 3 in present market (local composite) | 0.30 | 0.26 |

The wear resistance of Embodiment 7 is tested by observing whether the shoe covers lose plastic after the shoe covers are worn on a same person and rubbed on a plastic floor in circles, and the test result is shown in the following Table 2:

| Comparative Example | Worn and Peeling off Numbers of cycles | | | |
|---|---|---|---|---|
| | 1 | 5 | 10 | 20 |
| Embodiment 7 (shoe cover - material of Embodiment 4) | No | No | No | No |
| Shoe cover product in present market (shoe cover - material 2 in present market) | No | Worn and Peeling off | Worn and Peeling off | Worn and Peeling off |

The high temperature resistant type of the shoe cover products of Embodiment 7 and in the present market are tested according to ASTM F1980-07, at 80° C. and at 50% RH. The specific operating method is: taking two films of the same material of 10 cm*10 cm, placing the two films face-to-face, putting them in an oven with set temperature and humidity, and checking if the films stick together every hour. The test result is shown in the following Table 3:

| Comparative Example | Stickiness Time/hours | | |
|---|---|---|---|
| | 1 | 4 | 8 |
| Embodiment 7 (shoe cover - material of Embodiment 4) | non-stick | non-stick | non-stick |
| Shoe cover product in present market (shoe cover - material 2 in present market) | Slightly stick together | Stick together | Stick together |

From Table 1, it can be seen that the non-stick high-friction material made in the present application has the following advantages when compared with the similar products: it has good anti-slip property, static friction coefficient higher than products in the current market more than 110%, and dynamic friction coefficient higher than 130%.

From Table 2, it can be seen that the non-stick high-friction material and the medical shoe cover products made in the present application has the following advantages when compared with the similar products: they have good wear resistance, do not lose plastic, and have wear resistance at least 4 times of similar products in the market.

From Table 3, it can be seen that the non-stick high-friction material made in the present application has the following advantages when compared with the similar products: it has no stickiness, is not sticky under high temperature, can endure higher temperature transport for a long time, and the high temperature resistant time is at least 8 times of similar products in the market. Applying the material to the shoe covers, may improve the heat resistance of the shoe covers, so as to be convenient for long-time transport.

The embodiments described above are only for illustrating the technical concepts and features of the present application, and are intended to make those skilled in the art being able to understand the present application and thereby implement it, and should not be concluded to limit the protective scope of this application. Any equivalent variations or modifications according to the present application should be covered by the protective scope of the present application.

What is claimed is:

1. A shoe cover comprising:
   a shoe cover upper comprised of non-woven fabric, the upper shoe cover having a front end and a rear end;
   a shoe cover opening formed in the shoe cover upper, the shoe cover opening defined by a top edge of the shoe cover upper;
   a shoe cover sole integrated with the shoe cover upper, the shoe cover sole having a bottom surface;
   a first sealing part extending from the top edge to the bottom surface of the shoe cover sole towards the front end of the shoe cover upper, the first sealing part having a reinforced structure including a blocky fabric folded in half and sealed therewith, wherein the reinforced structure is discretely located at a single location along the first sealing part, proximate the top edge of the shoe cover upper;
   a second sealing part extending from the top edge to the bottom surface of the shoe cover sole towards a rear end of the shoe cover upper;
   a first elastic ring provided within a first accommodating space of the shoe cover upper proximate the shoe cover opening, below the top edge of the shoe cover upper, wherein a portion of the non-woven fabric is infolded at the top edge of the shoe cover upper to form the first accommodating space which is a first channel that extends around the shoe cover upper proximate the shoe cover opening;
   a second elastic ring provided within a second accommodating space of the shoe cover upper proximate the shoe cover sole, above the bottom edge of the shoe cover upper, wherein a strip of fabric is sealed against the non-woven fabric of the shoe cover upper to form the second accommodating space which is a second channel that extends around the shoe cover upper proximate the shoe cover sole; and
   a plurality of anti-slip strips disposed on the bottom surface of the shoe cover sole, the plurality of anti-slip strips comprised of an isotactic polypropylene polymer and/or an isotactic polypropylene derivative;
   wherein a portion of the first sealing part and a portion of the second sealing part extends between the plurality of anti-slip strips disposed on the bottom surface of the shoe cover sole.

2. The shoe cover according to claim 1, wherein a flow rate parameter of the isotactic polypropylene polymer and/or the isotactic polypropylene derivative is 5.5-8.

3. The shoe cover according to claim 1, wherein the isotactic polypropylene polymer and/or the isotactic polypropylene derivative contains an isotactic co-polypropylene elastomer containing 5-30% by mass of an ethylene structure, and/or an isotactic homo-polypropylene having a melt index of 1-15 g/10 min under conditions of ASTM D1238, 190° C. and 2.16 KG.

4. The shoe cover according to claim 1, wherein a raw material formula of the isotactic polypropylene polymer and/or the isotactic polypropylene derivative contains the following components in percentage by mass:
   isotactic co-polypropylene elastomer 20-90%;
   isotactic homo-polypropylene 10-80%.

5. The shoe cover according to claim 1, wherein a raw material formula of the isotactic polypropylene polymer and/or the isotactic polypropylene derivative contains the following components in percentage by mass:
   isotactic co-polypropylene elastomer 10-99.5%;
   polyethylene 0-90%.

6. The shoe cover according to claim 1, wherein according to ASTM D1238 at 190° C. and 2.16 KG, a melt index of the isotactic polypropylene polymer and/or the isotactic polypropylene derivatives is 0.5-20 g/min;
   or, a density of the isotactic polypropylene polymer and/or the isotactic polypropylene derivative is 0.7-1.1 g/cm3.

7. The shoe cover according to claim 1, wherein the anti-slip strips are in a shape of at least one of: strips, circles, dots, and S-shapes.

8. The shoe cover according to claim 1, wherein the shoe cover is formed by sealing after folding the non-woven fabric in half.

9. The shoe cover according to claim 1, wherein a distance between the second elastic ring and the bottom surface of the shoe cover sole is 5-25 mm.

10. The shoe cover according to claim 1, wherein the front end and the rear end of the shoe cover upper is curve-shaped.

* * * * *